(12) United States Patent
Zhao et al.

(10) Patent No.: US 9,354,856 B2
(45) Date of Patent: May 31, 2016

(54) SOFTWARE INSTALLATION METHOD AND DEVICE

(71) Applicant: BEIJING QIHOO TECHNOLOGY COMPANY LIMITED, Xicheng District, Beijing (CN)

(72) Inventors: Chenxi Zhao, Beijing (CN); Weihua Tao, Beijing (CN); Jinwei Li, Beijing (CN); Huan Ren, Beijing (CN)

(73) Assignee: Beijing Qihoo Technology Company Limited, Xicheng District, Beijing (CN)

( * ) Notice: Subject to any disclaimer, the term of this patent is extended or adjusted under 35 U.S.C. 154(b) by 0 days.

(21) Appl. No.: 14/364,213

(22) PCT Filed: Dec. 12, 2012

(86) PCT No.: PCT/CN2012/086474
§ 371 (c)(1),
(2) Date: Jun. 10, 2014

(87) PCT Pub. No.: WO2013/086988
PCT Pub. Date: Jun. 20, 2013

(65) Prior Publication Data
US 2015/0007165 A1 Jan. 1, 2015

(30) Foreign Application Priority Data

Dec. 12, 2011 (CN) .......................... 2011 1 0412482

(51) Int. Cl.
*G06F 9/445* (2006.01)
*G06F 9/44* (2006.01)
(52) U.S. Cl.
CPC .. *G06F 8/61* (2013.01); *G06F 8/67* (2013.01); *G06F 8/68* (2013.01)

(58) Field of Classification Search
None
See application file for complete search history.

(56) References Cited

U.S. PATENT DOCUMENTS 6,275,987 B1 * 8/2001 Fraley et al. ................. 717/127
7,028,295 B2 * 4/2006 Li .......................... H04L 29/06
709/223

(Continued)

OTHER PUBLICATIONS

Trezentos et al. Apt-pbo: Solving the Software Dependency Problem using Pseudo-Boolean Optimization. Proceedings of the IEEE/ACM international conference on Automated software engineering. ACM, 2010. Retrieved on [Jan. 23, 2016] Retrieved from the Internet: URL<http://dl.acm.org/citation.cfm?id=1859087>.*

(Continued)

*Primary Examiner* — Thuy Dao
*Assistant Examiner* — Cheneca Smith
(74) *Attorney, Agent, or Firm* — James M. Stipek; Polsinelli PC

(57) ABSTRACT

Disclosed are a software installation method and device. The software installation method comprises: dividing all the files of a to-be-installed software into core files and non-core files, wherein the core files are files used to achieve an active trigger function, and the non-core files are files used to achieve a passive trigger function; generating an installation sub-package of the core files and an installation sub-package of the non-core files; upon installing the to-be-installed software, using the installation sub-package of the core file to install the core files and run the core files, so that the active trigger function of the to-be-installed software operates normally. By means of the present application, the time for users to wait for software installation is shortened, and the user experience is improved.

12 Claims, 4 Drawing Sheets

(56) References Cited

U.S. PATENT DOCUMENTS

| | | | |
|---|---|---|---|
| 7,330,894 B2 | 2/2008 | Vallone | |
| 7,516,452 B1 * | 4/2009 | Vook | G06F 8/61 717/168 |
| 7,530,065 B1 * | 5/2009 | Ciudad et al. | 717/174 |
| 7,761,870 B2 * | 7/2010 | Westendorf et al. | 717/175 |
| 7,793,284 B2 * | 9/2010 | Mason | G06F 8/61 709/220 |
| 8,065,675 B2 * | 11/2011 | Strauss | G06F 8/61 709/201 |
| 8,407,693 B2 * | 3/2013 | Best | G06F 8/60 717/169 |
| 8,495,622 B2 * | 7/2013 | Redpath | G06F 8/61 717/175 |
| 8,533,704 B2 * | 9/2013 | Wookey | G06F 8/68 717/174 |
| 2002/0188941 A1 | 12/2002 | Cicciarelli et al. | |
| 2003/0097400 A1 * | 5/2003 | Li | H04L 29/06 709/203 |
| 2005/0229174 A1 * | 10/2005 | Westendorf et al. | 717/175 |
| 2010/0257521 A1 * | 10/2010 | Navarro | 717/174 |
| 2011/0252414 A1 * | 10/2011 | Chiu et al. | 717/173 |

OTHER PUBLICATIONS

Nishimura et al. Virtual Clusters on the Fly—Fast, Scalable, and Flexible Installation.Seventh IEEE International Symposium on Cluster Computing and the Grid, 2007, pp. 549-556, Retrieved on [Jan. 23, 2016] Retrieved from the Internet: URL<http://ieeexplore.ieee.org/xpls/abs_all.jsp?arnumber=4215422>.*

CN1416057A, Chinese application, English translation of abstract only, 1 page.

CN101212759A, Chinese application, English translation of abstract only, 1 page.

CN102073488A, Chinese application, English translation of abstract only, 1 page.

International Search Report regarding PCT/CN2012/086474, issued Mar. 21, 2013, 4 pages.

* cited by examiner

őSOFTWARE INSTALLATION METHOD AND DEVICE

FIELD OF THE INVENTION

The present invention relates to the technical field of computers, and particularly to a software installation method and device.

BACKGROUND OF THE INVENTION

As the developing of computer technologies and network technologies, people have come to depend more and more on applications for various work and activities when they use computers, whereby people have higher and higher requirements for applications. Before using an application, it needs to install the application firstly, which is also called software installation.

Software installation generally refers to a procedure of reasonably placing into a system a group of associated software files which cooperate with one another to fulfill work, linking them to the system and enabling the software to run normally.

A conventional installation software integrates all software running files and all software running settings, and packages all running files and running settings into one installation program. Upon installation, it is necessary to extract the files, extract the settings and execute the settings, and it begins to run upon completion of installation of all files in the package, which requires a long installing time and cannot meet some users' requirement in use, for example, for those users who have high requirements for user experience and lack patience. For instance, a kind of MIS software in China has an installation package with a size of 400M, and the whole installation procedure of the software takes more than five minutes.

In addition, upon development, current installation software might need support from a third-party installation package manufacturer such as Nsis, and has an undesirable self-definition; there are so many interaction procedures such as unnecessary selection and confirmation, but users do not understand these issues such as the selection and interaction. These issues all lead to a long and tedious software installation duration, excessively waste users' time for waiting and therefore cannot bring satisfactory experience to the users.

At present, this conventional software installation procedure is long and tedious and vague in instruction, so the user can only use the software after waiting for a slow and long installation procedure, which already seriously affects the user's experience in use.

In one word, a technical problem to be solved urgently by those skilled in the art at present is how to shorten the user's waiting time and improve the user's experience in use during software installation.

SUMMARY OF THE INVENTION

In view of the above problem, the present invention is proposed to provide a software installation method and a corresponding software installation device, which overcome the above problems or at least partially solve or ease the above problems.

According to an aspect of the present invention, there is provided a software installation method, comprising: dividing all files of a to-be-installed software into core files for achieving an active trigger function and non-core files for achieving a passive trigger function; generating an installation sub-package of the core files and an installation sub-package of the non-core files; and upon installing the to-be-installed software, using the installation sub-package of the core files to install the core files and run the core files, so that the active trigger function of the to-be-installed software operates normally.

Preferably, the step of, upon installing the to-be-installed software, using the installation sub-package of the core files to install the core files and run the core files, so that the active trigger function of the to-be-installed software operates normally comprises: when the to-be-installed software begins to be installed, only using the installation sub-package of the core files to install the core files and run the core files, so that the active trigger function of the to-be-installed software operates normally.

Preferably, the software installation method further comprises: when the core files begin to run after installation, using the installation sub-package of the non-core files to install the non-core files.

Preferably, the software installation method further comprises: after completion of the installation of the core files, receiving an input instruction for installing the non-core files, and using the installation sub-package of the non-core files to install the non-core files.

Preferably, the step of using the installation sub-package of the core files to install the core files comprises: using the installation sub-package of the core files to install the core files with multiple threads, wherein the multiple threads comprise a main thread for installation initialization operation of the core files and a logic thread for executing the installation procedure of the core files.

Preferably, the multiple threads further comprise an interface thread for installation interface presentation of the core files.

Preferably, the step of using the installation sub-package of the core files to install the core files with multiple threads comprises: the logic thread starts the main thread; during the startup of the main thread, a message is sent to notify the interface thread to set a timer and begin to present the installation interface; the interface thread uses the timer to control display of an installation progress in the installation interface; and when the installation progress displays that the installation is completed, the interface thread sends a message to the logic thread and notifies the logic thread of the completion of installation of the core files.

Preferably, the step of running the core files comprises: running the core files by dynamically loading a dynamic link library DLL file in the core files.

Preferably, prior to the step of, upon installing the to-be-installed software, using the installation sub-package of the core files to install the core files and run the core files, further comprising: setting an installation environment and an installation path of the to-be-installed software; wherein the step of, upon installing the to-be-installed software, using the installation sub-package of the core files to install the core files and run the core files comprises: upon installing the to-be-installed software, using the installation sub-package of the core files to install the core files and run the core files under the installation environment and the installation path.

Preferably, the installation path comprises a default installation path and an alternate installation path; and the step of, upon installing the to-be-installed software, using the installation sub-package of the core files to install the core files and run the core files under the installation environment and the installation path comprises: upon installing the to-be-installed software, using the installation sub-package of the core files to install the core files and run the core files under the installation environment and the default installation path;

and, if the installation of the core files fails under the installation environment and the default installation path, using the installation sub-package of the core files to install the core files and run the core files under the installation environment and the alternate installation path.

Preferably, the software installation method further comprises: while installing the to-be-installed software, receiving an input installation path and withdrawing the installed core files under the set installation environment and installation path, and under the input installation path, using the installation sub-package of the core files to install the core files and run the core files.

Preferably, the core files for achieving the active trigger function are files that can run after the to-be-installed software is installed and run without the need of other factors besides the factor of start and running of the to-be-installed software, and the non-core files for achieving the passive trigger function are files that can run after the to-be-installed software is installed and run with the need of other factors besides the factor of the start and running of the to-be-installed software.

According to another aspect of the present invention, there is provided a software installation device, comprising: a dividing module configured to divide all files of a to-be-installed software into core files for achieving an active trigger function and non-core files for achieving a passive trigger function; a generating module configured to generate an installation sub-package of the core files and an installation sub-package of the non-core files; and an installing module configured to, upon installing the to-be-installed software, use the installation sub-package of the core files to install the core files and run the core files, so that the active trigger function of the to-be-installed software operates normally.

Preferably, the installing module is configured to, when the to-be-installed software begins to be installed, only use the installation sub-package of the core files to install the core files and run the core files, so that the active trigger function of the to-be-installed software operates normally.

Preferably, the software installation device further comprises: a continued installation module configured to, when the core files begin to run after installation, use the installation sub-package of the non-core files to install the non-core files; or configured to, after completion of the installation of the core files, receive an input instruction for installing the non-core files, and use the installation sub-package of the non-core files to install the non-core files.

Preferably, the installing module is configured to, upon installing the to-be-installed software, use the installation sub-package of the core files to install the core files with multiple threads so that the active trigger function of the to-be-installed software operates normally, wherein the multiple threads comprise a main thread for installation initialization operation of the core files and a logic thread for executing the installation procedure of the core files.

Preferably, the multiple threads further comprise an interface thread for installation interface presentation of the core files.

Preferably, the installing module is configured in such a way that when the installation sub-package of the core files is used to install the core files with multiple threads, the logic thread starts the main thread; during the startup of the main thread, a message is sent to notify the interface thread to set a timer and begin to present the installation interface; the interface thread controls display of an installation progress in the installation interface by means of the timer; and when the installation progress displays that the installation is completed, the interface thread sends a message to the logic thread in order to notify the logic thread of the completion of installation of the core files.

Preferably, the installing module is configured to, upon running the core files, run the core files by dynamically loading a dynamic link library DLL file in the core files.

Preferably, the software installation device further comprises: a setting module configured to set an installation environment and an installation path of the to-be-installed software before the installing module uses the installation sub-package of the core files to install the core files and run the core files; wherein the installing module is configured to, upon installing the to-be-installed software, use the installation sub-package of the core files to install the core files and run the core files under the installation environment and the installation path so that the active trigger function of the to-be-installed software operates normally.

Preferably, the installation path comprises a default installation path and an alternate installation path; and the installation module is configured to, upon installing the to-be-installed software, use the installation sub-package of the core files to install the core files and run the core files under the installation environment and the default installation path; and if the installation of the core files fails under the installation environment and the default installation path, use the installation sub-package of the core files to install the core files and run the core files under the installation environment and the alternate installation path, so that the active trigger function of the to-be-installed software operates normally.

Preferably, the software installation device further comprises: a receiving module configured to, while the installing module installs the to-be-installed software, receive an input installation path and withdraw the installed core files under the set installation environment and installation path, send the input installation path to the installing module so that the installing module uses the installation sub-package of the core files to install the core files and run the core files under the input installation path, so that the active trigger function of the to-be-installed software operates normally.

Preferably, the core files for achieving the active trigger function are files that can run after the to-be-installed software is installed and run without the need of other factors besides the factor of start and running of the to-be-installed software; and the non-core files for achieving the passive trigger function are files that can run after the to-be-installed software is installed and run with the need of other factors besides the factor of the start and running of the to-be-installed software.

According to a further aspect of the present invention, there is provided a computer program which comprises a computer readable code; wherein when the computer readable code is run on a server, the server executes the software installation method according to any one of claims 1-12.

According to a further aspect of the present invention, there is provided a computer readable medium which stores the computer program.

Advantageous effects of the present invention are as follows:

The software installation solution according to the present application divides files in the to-be-installed software according to the active trigger function and the passive trigger function so as to determine core files and non-core files. Upon installation, the core files are installed and run first and the necessary files for running the software are minimized. As such, in the case that the core files are installed, the user may run the software normally, interact with the software and use its basis functions. In this course, the non-core files are installed subsequently in the background of the system, or the user sends an instruction to install the non-core files when needed. The core files account for a small proportion in the whole software and thus can be installed at a fast speed, thereby effectively reducing the time for the user to wait for software installation. When installing the non-core files, the user may already use the core files to run the software without anxiously waiting for completion of installation of all files, which substantially improves the user's experience in use. For example, when installing the 360 Browser, files for performing the active trigger functions of the 360 Browser, such as the main program file 360se.exe of the 360 Browser for performing webpage loading and displaying function, are installed first as the core files. After the installation, the user may communicate with a set address by using the main interface of the 360 Browse. While the main interface is displayed for using by the user, it continues to install the non-core files of the 360 Browser in the background of the system, such as files for achieving updating. However, this procedure might not be perceived by the user so that the user subjectively feels that the software installation speed is quickened.

The technical solution of the present application effectively solves the problem in current software installation that the user has to wait for a long time period with an undesirable user's experience because he cannot use the software until installation of all files are completed, and achieves an effect of shortening the time period for the user to wait for completion of the software installation and improving the user's experience.

The above description is only generalization of technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF DRAWINGS

Various other advantages and merits will become apparent to those having ordinary skill in the art by reading through the following detailed description of preferred embodiments. Figures are only intended to illustrate preferred embodiments not to limit the present invention. In all figures, the same reference number denotes the same part. In the figures.

DETAILED DESCRIPTION OF EMBODIMENTS

The present invention will be further described below with reference to figures and specific embodiments.

Embodiment 1

Figure 1:
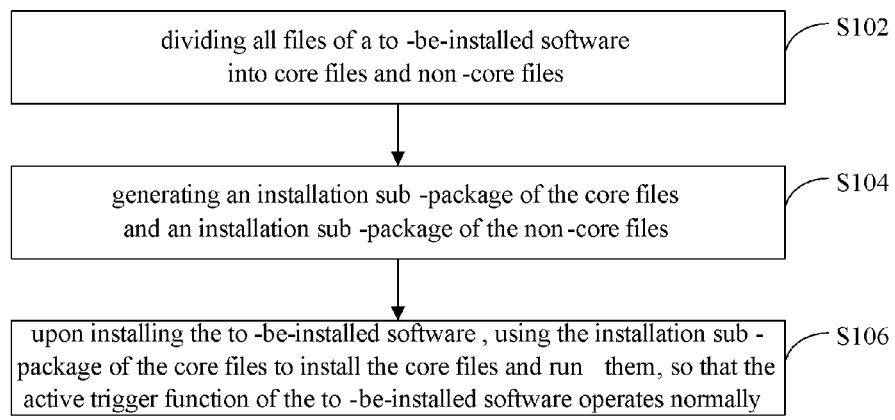
FIG. 1 illustrates a flow chart of steps of a software installation method according to embodiment 1 of the present application.

Referring to FIG. 1, the figure illustrates a flow chart of steps of a software installation method according to embodiment 1 of the present application.

The software installation method of the present embodiment comprises the following steps.

Step S102: dividing all the files of a to-be-installed software into core files and non-core files.

The core files are files used to achieve an active trigger function, and for example, these files are files that can run after the to-be-installed software is installed and run without the need of other factors besides the factor of start and running of the software, e.g., files that may be executed without the user's any input after the installation of the software. The 360 Browser is taken as an example. and its core files may comprise main program file 360se.exe file of the 360 Browser that completes webpage loading function and display function. The non-core files are files used to achieve a passive trigger function, and for example, these files may be files that can run after the to-be-installed software is installed and run with the need of other factors besides the factor of the start and running of the to-be-installed software. For example, the non-core files are files the running of which requires the user's further input or confirmation after the software installation, such as files of ordinary browsers or software that execute download function or updating function.

Step S104: generating an installation sub-package of the core files and an installation sub-package of the non-core files.

After the dividing of the core files and the non-core files, different installation packages are generated for the two portions of files, namely, an installation sub-package of the core files and an installation sub-package of the non-core files. The two sub-packages form an installation package of the whole to-be-installed software, wherein the installation sub-package of the non-core files may be further divided into a plurality of sub-packages according to certain rules and needs.

Step S106: upon installing the to-be-installed software, using the installation sub-package of the core files to install the core files and run the core files, so that the active trigger function of the to-be-installed software operates normally.

Preferably, when the to-be-installed software starts to be installed, only the installation sub-package of the core files is used to install the core files and run the core files, so that the active trigger function of the to-be-installed software operates normally.

Upon start of the installation, only the core files are installed, and the non-core files may be installed subsequently. After the core files are installed, installation of relevant interfaces and/or relevant logics of the software has been completed, and the software may run normally in a basic function manner to achieve the active trigger function and interact with the user to thereby make the user subjectively believe that installation of the software has already been substantially completed. At this time, the non-core files continue to be installed in the background without perception of the user, and this does not affect normal use of the active trigger function of the software achieved by running the core files, and the user intuitively feels a quick installation speed and a good experience in use. Certainly, the installation of the non-core files may also be performed in a manner that may be perceived by the user but does not affect the running of the software, or the non-core files may be installed subsequently by the user by inputting an instruction for installing the non-core files.

Certainly, upon installing the to-be-installed software, those skilled in the art may employ other similar ways to improve the installation speed. For example, it is feasible to simultaneously or sequentially start two procedures respectively for installing the core files and installing the non-core files, but the core files are run right after the installation of the core files are completed by the core-file installing procedure, to achieve acceleration of installation.

In this embodiment, files in the to-be-installed software are divided according to the active trigger function and the passive trigger function, and thus core files and non-core files are determined. Upon installation, the core files are installed and run first, and the necessary files for running the software are minimized. As such, in the case that the core files are installed, the user may run the software, interact with the software and use its basis functions. In this course, the non-core files are installed subsequently in the background of the system, or the user sends an instruction to install the non-core files when needed. The core files account for a relatively small proportion in the whole software and thus can be installed at a fast speed, thereby effectively reducing the time for the user to wait for software installation. When installing the non-core files, the user may already use the core files to run the software without anxiously waiting for completion of installation of all files, which substantially improves the user's experience in use. The technical solution of the present application effectively solves the problem in current software installation that the user has to wait for a long time period with an undesirable user's experience because he cannot use the software until installation of all files are completed, and achieves the effects of shortening the time period for the user to wait for completion of the software installation and improving the user's experience.

Embodiment 2

Figure 2:
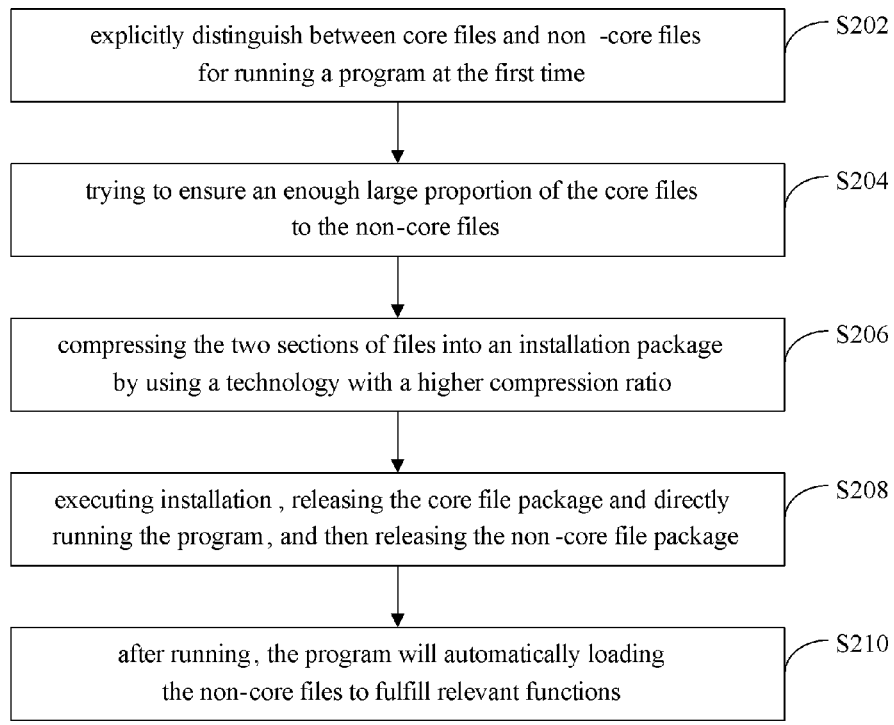
FIG. 2 illustrates a flow chart of steps of a software installation method according to embodiment 2 of the present application.

Referring to FIG. 2, this figure illustrates a flow chart of steps of a software installation method according to embodiment 2 of the present application.

The software installation method according to the present embodiment comprises the following steps.

Step S202: explicitly distinguish between core files and non-core files for running a program at the first time.

In other words, all files included in the to-be-installed software are divided into necessary core files and non-core files on the basis that the files execute the active trigger function or the passive trigger function when the program is run at the first time after the software is installed.

Take the 360 Security Guards as an example. Its core files may comprise a main interface of the Guards. The navigation area of the Guards includes several major functions, and the displayed content below it will change after any function is clicked. The files not related to the function that need to be displayed immediately after start (mainly in displayed content area here) may be considered as non-core files.

Step S204: trying to ensure an enough large proportion of the core files to the non-core files.

That is to say, a smaller number of core files are ensured from perspective of the running of the software. The proportion may be divided and controlled by those skilled in the art according to actual situations of the software. The fewer core files there are, the faster the installation speed is, and the quicker the program is started after the installation. Usually, the proportion of the core files to the non-core files should be maintained 4:6 or below, preferably 3:7.

Step S206: compressing the two sections of files into an installation package by using a technology with a higher compression ratio.

Under current hardware conditions, time consumption of the installation package mainly lies in a transmission efficiency of files from the installation package to an destination, so those skilled in the art may employ a proper technology with a higher compression ratio, e.g., zip or 7z technology, to compress the two sections of files, namely, core files and non-core files, respectively, and then combine them into one installation package.

Step S208: executing installation, releasing the core file package and directly running the program, and then releasing the non-core file package.

Upon performing software installation, the core-file compression package is used firstly to perform installation of the core files, and the core files are directly run after installation so that the user can use the functions of the core files, and then installation of the non-core files follows.

In the present embodiment, after completing the installation of the core files of the 360 Security Guards, the 360 Security Guards and relevant logics are run right away, and the main interface of the 360 Security Guards will be displayed. Then the installation of the non-core files of the 360 Security Guards will follow, e.g., non-core files performing functions in the navigation area of the 360 Security Guards will be installed.

Step S210: after running, the program will automatically loading the non-core files to fulfill relevant functions.

After the running of the program, one the one hand, the installation program may continue to install the non-core files on its own at the beginning of the running of the program. On the other hand, the installation program may direct the installation of the non-core files to the user. The timing for installing the non-core files is determined by means of the non-core file installing instruction input by the user so as to perform the installation of the non-core files. The subsequent various non-core file installing manners provide more options for the user to install software, make software installation more flexible, and further improve the user's experience.

In this embodiment, files in the to-be-installed software are divided into core files and non-core files. Upon software installation, the core files are installed and run first. The proportion of the core files in the whole to-be-installed software is controlled. The technology with a higher compression ratio is used to compress the core files and non-core files to effectively ensure transmission efficiency upon software installation and the size of necessary core files, effectively improve software installation speed, shorten the user's waiting time and improve the user's experience.

Embodiment 3

Figure 3:
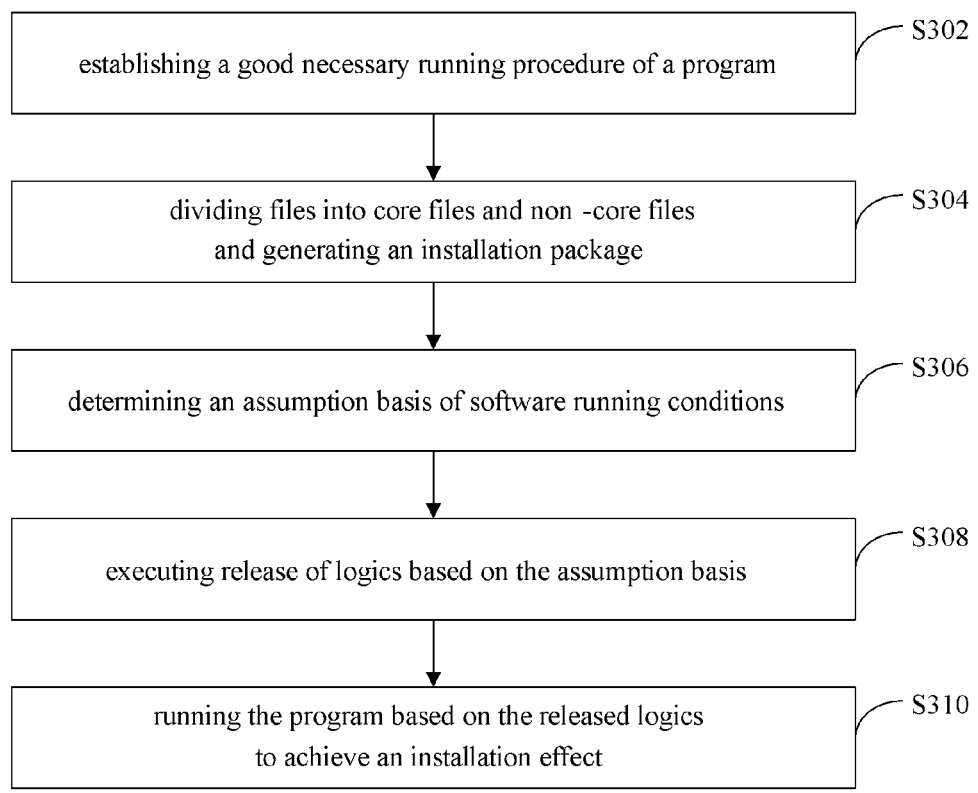
FIG. 3 illustrates a flow chart of steps of a software installation method according to embodiment 3 of the present application.

Referring to FIG. 3, the figure illustrates a flow chart of steps of a software installation method according to embodiment 3 of the present application.

The software installation method according to the present embodiment comprises the following steps.

Step S302: establishing a good necessary running procedure of a program.

The step is performed by a software technician before the packaging of the to-be-installed software. The step comprise: determining function properties requisite for the program and deleting redundant repetitious functions; explicitly dividing active and passive trigger function properties; strictly executing configuration of the above two classes of function properties and minimizing reference to and dependency on other modules.

Step S304: dividing files into core files and non-core files and generating an installation package.

In this step, files are divided into core files and non-core files according to the active trigger function and passive trigger function to be achieved after the installation of software. Installation of the 360 Browser is taken as an example. Files for achieving the active trigger function, namely, core files for installing the 360 Browser may comprise: 360se.exe (a main program file, performing webpage loading and displaying function), Favorites.dll (a favorites module which is directed to the core file package since the favorites once added by the user needs to be displayed after start), Safecentral.dll (a safety traffic light module which needs to be run upon start because online security needs to be ensured in real time), Pluginbar.dll (a plugins bar which is directed to the core file package since plugins once added by the user need to be displayed after start). Files for achieving the passive trigger function, namely, non-core files for installing the 360 Browser may comprise: Download.dll (a download module which needn't be started immediately if the user does not perform downloading), and Seup.exe (a program updating module which is directed to the non-core file package because updating is performed once a day).

An installation package is generated after division of the core files and non-core files. The installation package comprises a core-file installation sub-package and a non-core file installation sub-package, wherein actively triggered function properties and files are classified as the core file type to generate the core-file installation sub-package; passively triggered function properties and files are classified as the non-core file type to generate the non-core file installation sub-package.

Step S306: determining an assumption basis of software running conditions

The step comprises: setting a path to which the software needs to installed upon normal running; and setting a system environment to be used upon normal running of the software, e.g., a magnetic disk is writeable and has a sufficient free space.

The installation environment and installation path are set, and a large batch of items which will not be set by a majority of users are determined and executed by default, so that the to-be-installed software may be directly installed under the set installation environment and the set installation path without the user's input, which reduces unnecessary interaction between the to-be-installed software and the user, shortens the installation time, improves the installation efficiency and enhances the user's experience.

Preferably, it is feasible to set an alternate installation path so that when installation fails under the preset default installation path, the alternate installation path is used to install the software under the alternate installation path. The alternate installation path ensures quick and accurate installation of the software and avoids software installation failure to a certain extent.

Noticeably, step S306 and step S304 may be executed without in a defined sequential order, i.e., it is feasible to divide files into core files and non-core files, and then generate the installation package, and then set the installation environment and installation path; or set the installation environment and installation path first and then divide files into the core files and non-core files, and then generate the installation package.

Besides, the step is an optional step. In practice, an interface for inputting an installation path may be provided to the user, and the user inputs a custom installation path.

Step S308: executing release of logics based on the assumption basis.

That is to say, after the installation package is run, the core files are released at once according to the given installation environment and installation path.

Noticeably, during the installation process, if the user customizes the installation path, the previously released files need to be withdrawn. If the release to the user's first custom installation path fails, the alternate installation path will be written in; and if the release to each of all installation paths fails, the user will be prompted of failure to install. By providing with the interface for inputting the custom installation path, the user has an opportunity to flexibly choose the installation path. However, as compared with the predetermined installation path, this manner increases software installation time.

Step S310: running the program based on the released logics to achieve an installation effect.

The step comprises: starting the program immediately for the user to use; meanwhile, the user may use the active trigger functions, namely, the functions achieved by installing the core files (e.g., since a home page needs to be loaded, so the webpage loading function must be provided upon startup); meanwhile, the background continues to release the non-core files to provide the user other passive trigger functions, namely, functions (e.g., downloading) achieved by installing the non-core files.

Upon specific implementation, the installation program is developed by means of the multi-thread technology and uses multiple threads to install the core files and non-core files.

The multiple threads used by the installation program comprise a main thread and a logic thread, wherein the main thread is used for installation initialization operation of the core files and/or non-core files, and the logic thread is used to execute the installation procedure of the core files and/or non-core files. Preferably, the multiple threads may further comprise an interface thread for installation interface presentation of the core files and/or non-core files. The speed and efficiency of software installation are further improved by the multiple threads.

In this embodiment, the installation program maintains three threads: the main thread, interface thread and the logic thread. The main thread is responsible for initialization operation of the installation program, the interface thread is responsible for presentation of a UI (user interface, namely, installation interface), and the logic thread is responsible for execution of the installation procedure.

When the core files are installed, the logic thread invokes CreateProcess to start the main thread. During the startup of the main thread, a message is sent to notify the interface thread to set a timer, and the interface thread begins to work, and the installation interface is present. The timer controls a display degree of an installation progress in the installation interface. The 360 Browser is taken as an example, wherein uniform acceleration effect processing of a progress bar is ensured in a second. When the installation progress shows the completion of installation of the core files, the interface thread, by sending a message, notifies the logic thread of the completion of installation of the core files, and the logic thread completes subsequent finishing work. The interface thread may make the user aware of software installation progress, enhance the use feeling of the interface, and improves the user's experience. Certainly, in practice, the interface thread may not be used and the installation interface may not be displayed. Upon completion of the installation of the core files, the main thread sends a message to notify the logic thread, or the logic thread acquires information about the completion of the installation of the core files in a manner such as automatic acquisition.

After completion of the installation of the core files, installed corresponding modules are loaded to start running. The program employs a dynamic loading manner to load a DLL (dynamic link library) module, and maps a designated executable module (namely, DLL module) to an address space of an invoked process via a LoadLibrary function. A GetProcAddress function is invoked to acquire an address of a relevant derivation function in the dynamic link library, and the function implemented by the module is used by means of invoking the address. Usually, it is necessary to access a certain function in a certain DLL only when a certain condition is satisfied during the running of the program, and unnecessary to access these functions in the DLL in other cases. With the dynamic loading manner being utilized, the DLL module is loaded into a memory when needed and mapped into the address space of the invoked process, and this solves the problem that the memory of the program process loads too many modules once and allocates too much address space for each module, which seriously wastes the system resource and causes an excessively long startup period of the program.

After completing the installation of the core files, interaction is generated between a program interface of the installed software and the user. However, at this time, the installation program does not exit from the background until release of all files in the non-core file package is completed. In this embodiment, after completing the installation of the core files, the release of the non-core files is accomplished in a way that the installation program itself triggers, immediately following the release of the core files. Noticeably, the above multi-thread technology is also applicable to the installation of the non-core files, and the above dynamic loading DLL technology is also applicable to the loading operation of the non-core files.

The installation resources by classification, which is processed by this embodiment, can solve the problem that initialization of the installation program takes too long time, too many files are released one time and the installation progress is not smooth, and achieve a quick installation effect. The software installation method according to this embodiment requires more rigorous structural conditions for program running, differentiates from a relatively loose structure in a conventional program, and minimizes necessary files for running the program. For example, the installation of 360 Browser may be completed in one second by means of this embodiment.

In addition, load failure of the non-core files might occur during the installation, and may be solved only by restarting at this time.

Embodiment 4

Figure 4:
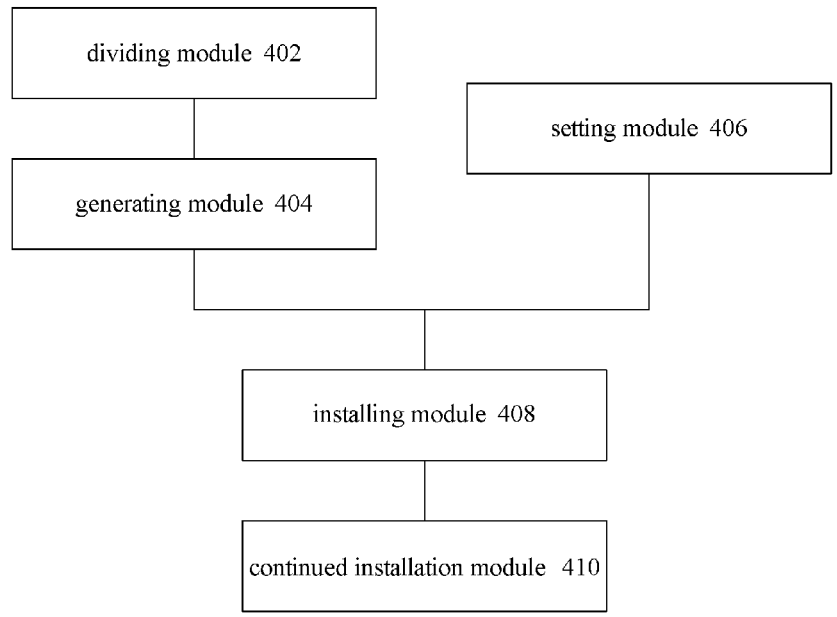
FIG. 4 illustrates a structural block diagram of a software installation device according to embodiment 4 of the present application.

Referring to FIG. 4, the figure illustrates a structural block diagram of a software installation device according to embodiment 4 of the present application.

The software installation device according to this embodiment comprises: a dividing module 402 configured to divide all the files in to-be-installed software into core files and non-core files, wherein the core files are files used for achieving an active trigger function, and the non-core files are files used for achieving a passive trigger function; a generating module 404 configured to generate an installation sub-package of the core files and an installation sub-package of the non-core files; an installing module 408 configured to, upon installing the to-be-installed software, use the installation sub-package of the core files to install the core files and run the core files, so that the active trigger function of the to-be-installed software operates normally.

Preferably, the installing module 408 is configured to, when the to-be-installed software begins to be installed, only use the installation sub-package of the core files to install and run the core files, so that the active trigger function of the to-be-installed software operates normally.

Preferably, the software installation device according to this embodiment further comprises a continued installation module 410 configured to, when the core files begin to run after installation, use the installation sub-package of the non-core files to install the non-core files; or after completion of the installation of the core files, receive an input instruction for installing the non-core files, and use the installation sub-package of the non-core files to install the non-core files.

Preferably, the installing module 408 is configured to, upon installing the to-be-installed software, use the installation sub-package of the core files to install the core files by using multiple threads, and run the core files so that the active trigger function of the to-be-installed software operates normally.

Preferably, the multiple threads comprise a main thread and a logic thread, wherein the main thread is used for installation initialization operation of the core files, and the logic thread is used to execute an installation procedure of the core files.

Preferably, the multiple threads further comprise an interface thread for installation interface presentation of the core files.

Preferably, the installing module 408 is configured in such a way that when the installation sub-package of the core files is used to install the core files by using multiple threads, the logic thread starts the main thread; during the startup of the main thread, a message is sent to notify the interface thread of setting a timer and beginning to present the installation interface; the interface thread uses the timer to control display of installation progress in the installation interface; when the installation progress displays that the installation is completed, the interface thread sends a message to the logic thread in order to notify the logic thread of the completion of installation of the core files.

Preferably, the installing module 408 is configured to, upon running the core files, run the core files by dynamically loading a DLL file in the core files.

Preferably, the software installation device according to the present invention further comprises: a setting module 406 configured to set an installation environment and an installation path of the to-be-installed software before the installing module 408 uses the installation sub-package of the core files to install the core files and run the core files. The installing module 408 is configured to, upon installing the to-be-installed software, use the installation sub-package of the core files to install the core files and run the core files under the set installation environment and installation path so that the active trigger function of the to-be-installed software operates normally. The setting module 406 and the dividing module 402 may not be executed in a defined sequential order.

Preferably, the installation path set by the setting module 406 comprises a default installation path and an alternate installation path. The installation module 408 is configured to, upon installing the to-be-installed software, use the installation sub-package of the core files to install the core files and run the core files under the installation environment and the default installation path; if installation of the core files fails under the installation environment and the default installation path, use the installation sub-package of the core files to install the core files and run the core files under the installation environment and the alternate installation path, so that the active trigger function of the to-be-installed software operates normally.

Preferably, the software installation device according to the present invention further comprises: a receiving module (not shown) configured to, during the process that the installing module 408 installs the to-be-installed software, receive an input installation path and withdraw core files already installed under the installation environment and installation path set by the setting module 406, and send the input installation path to the installing module 408 so that the installing module 408 uses the installation sub-package of the core files to install the core files and run the core files under the input installation path, so that the active trigger function of the to-be-installed software operates normally.

Preferably, the core files for achieving an active trigger function are the files that can run without the need of other factors besides the factor of start and running of the to-be-installed software after the to-be-installed software is installed and run, e.g., files that may run without the user's input; the non-core files for achieving the passive trigger function are files that can run with the need of other factors besides the factor of the start and running of the to-be-installed software after the to-be-installed software is installed and run, e.g., files that are run according to the user's input.

The software installation device according to the present embodiment is used to implement the corresponding software installation method in the aforesaid method embodiments, and have the advantageous effects of the corresponding installation method, which will not be detailed here.

The present application changes an idea of a conventional installation package of stuffing files to the system first and then running into a new installation idea of trying to stuffing fewer files into the system and running right away, and then stuffing more files slowly. The following effects may be achieved through the plurality of software installation solutions of the present application:

(1) A friendly interaction interface: upon developing the to-be-installed software, the developer may self-define an interaction interface with rich controls and delicate display. Upon software installation, support for these controls and interaction interface may be provided to the user so as to bring better use experience to the user upon installing the software.

(2) Flexible development means: the development unnecessarily relies on SDK, e.g., NSIS, provided by the third-party installation package provider, and may utilize advanced programming language with the same origin as the program, such as C++ or C#.

(3) Strong maintainability and stability: current installation package technologies are mainly based on scripting language structure; when the size of the program and logical iterative reaches certain complexity, it is impossible to perform good maintenance and exhibit a better stability. Such risks may be avoided through the embodiments.

(4) Provide excellent user experience: a conventional installation package consumes extremely long time and seriously hinders the user's enthusiasm in using the software. Use of the technical solutions of the present application may provide excellent user experience and effectively boost the user's enthusiasm in using the software.

Embodiments of the present description all are described in a progressive manner, reference may be made to identical or similar portions of embodiments, and each embodiment focuses on differences from other embodiments. Particularly, regarding embodiments regarding devices, since they are substantially similar to method embodiments, they are described relatively simply, and reference may be made to partial description of method embodiments.

Embodiments regarding parts in the present invention may be implemented in hardware, or implemented by software modules running on one or more processor, or implemented in their combinations. Those skilled in the art should understand that a microprocessor or digital signal processor (DSP) may be used in practice to implement some or all functions of some or all parts of the device according to the software installation device in the embodiments of the present invention. The present invention may also be implemented as an apparatus or device program (e.g., computer program and computer program product) for executing part or all methods described here. Such programs for implementing the present invention may be stored in a computer-readable medium, or may be in a form of one or more signals. Such signals can be obtained by downloading from the Internet, or provided from a carrier signal or provided in any other forms.

Figure 5:
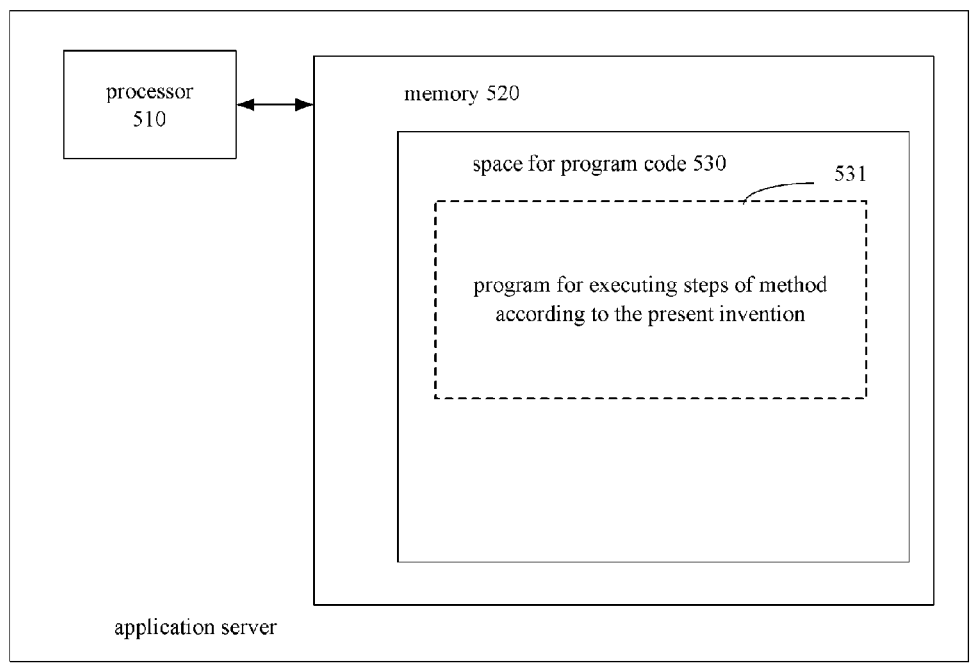
FIG. 5 illustrates a block diagram of a server for executing the method according to the present invention.
Figure 6:
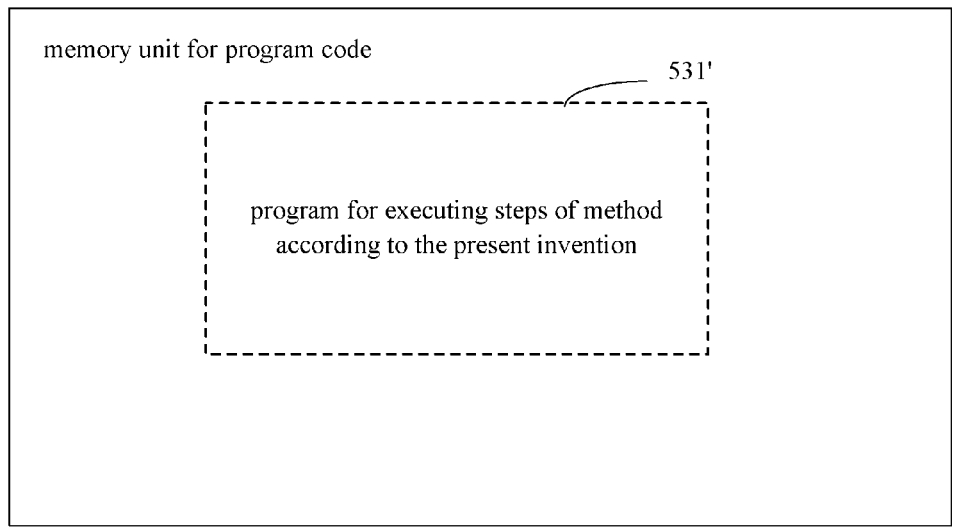
FIG. 6 illustrates a memory unit for maintaining or carrying a program code for implementing the method according to the present invention.

For example, FIG. 5 illustrates a server, for example, an application server, which can implement the software installation method and/or device according to the present invention. The server conventionally comprises a processor 510 and a computer program product or computer-readable medium in the form of a memory 520. The memory 520 may be a flash memory, EEPROM (Electrically Erasable Programmable Read-Only Memory), EPROM, hard disk or ROM-like electronic memory. The memory 520 has a storage space 530 for a program code 531 for executing any step of the above method. For example, the storage space 530 for the program code may comprise program codes 531 respectively for implementing steps of the above method. These program codes may be read from one or more computer program products or written into one or more computer program products. These computer program products comprise program code carriers such as hard disk, compact disk (CD), memory card or floppy disk. Such computer program products are usually portable or fixed memory unit as shown in FIG. 6. The memory unit may have a storage segment, a storage space or the like arranged in a similar way to the memory 520 in the server of FIG. 5. The program code may for example be compressed in a suitable form. Usually, the memory unit includes a computer-readable code 531', namely, a code readable by a processor for example similar to 510. When these codes are run by the server, the server is caused to execute steps of the method described above.

Reference herein to "one embodiment", "an embodiment", or to "one or more embodiments" means that a particular feature, structure, or characteristic described in connection with the embodiments is included in at least one embodiment of the invention. Furthermore, it is noted that instances of the phrase "in one embodiment" herein are not necessarily all referring to the same embodiment.

The description provided here describes a lot of specific details. However, it is appreciated that embodiments of the present invention may be implemented in the absence of these specific details. In some embodiments, in order to understand the present description without confusions, methods, structures and technologies well known in the art are not specified in detail.

It should be noted that the above embodiments are intended to illustrate but not to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the apparatus claims enumerating several units, several of these units can be embodied by one and the same item of hardware. The usage of the words first, second and third, et cetera, does not indicate any ordering. These words are to be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present invention is intended to be illustrative, but not limiting, of the scope of the invention, which is set forth in the claims.

What is claimed is:

1. A software installation method, comprising:
    dividing, by at least one processor, all files of a to-be-installed software into core files for achieving an active trigger function and non-core files for achieving a passive trigger function;
    generating, by the at least one processor, an installation sub-package of the core files and an installation sub-package of the non-core files, and setting an installation path of the to-be-installed software;
    when the to-be-installed software begins to be installed, only using the installation sub-package of the core files to install the core files directly under the set installation path;
    providing, by the at least one processor, an interface for receiving an input custom installation path while installing the to-be-installed software;
    withdrawing, by the at least one processor, the installed core files under the set installation path if the custom installation path is different from the set installation path, and re-installing the core files under the custom installation path;
    running, the core files by the at least one processor right after the installation of the core files is completed, so that the active trigger function of the to-be-installed software operates normally, wherein running the core files comprises running the core files by dynamically loading a dynamic link library DLL file in the core files; and
    when the core files begin to run after installation, using the installation sub-package of the non-core files to install the non-core files automatically by the at least one processor.

2. The method according to claim 1, wherein using the installation sub-package of the core files to install the core files comprises:
    using the installation sub-package of the core files to install the core files with multiple threads, wherein the multiple threads comprise a main thread for installation initialization operation of the core files and a logic thread for executing the installation procedure of the core files.

3. The method according to claim 2, wherein the multiple threads further comprise an interface thread for installation interface presentation of the core files.

4. The method according to claim 3, wherein using the installation sub-package of the core files to install the core files with the multiple threads comprises:
    starting the main thread by the logic thread, and sending a message during the startup of the main thread to notify the interface thread to set a timer and begin to present the installation interface;
    controlling display of an installation progress in the installation interface by the interface thread with the timer; and
    when the installation progress displays that the installation is completed, sending a message from the interface thread to the logic thread in order to notify the logic thread of the completion of installation of the core files.

5. The method according to claim 1, wherein the set installation path comprises a default installation path and an alternate installation path; and
    wherein upon installing the to-be-installed software, using the installation sub-package of the core files to install the core files under the default installation path; and, if the installation of the core files fails under the default installation path, using the installation sub-package of the core files to install the core files under the alternate installation path.

6. The method according to claim 1, wherein the core files for achieving the active trigger function are files that can run after the to-be-installed software is installed and run without the need of other factors besides the factor of start and running of the to-be-installed software, and the non-core files for achieving the passive trigger function are files that can run after the to-be-installed software is installed and run with the need of other factors besides the factor of the start and running of the to-be-installed software.

7. A software installation device, comprising:
    a memory having instructions stored thereon; and
    at least one processor to execute the instructions to perform operations for software installation, the operations comprising:
    dividing all files of a to-be-installed software into core files for achieving an active trigger function and non-core files for achieving a passive trigger function;
    generating an installation sub-package of the core files and an installation sub-package of the non-core files;
    setting an installation path of the to-be-installed software;
    when the to-be-installed software begins to be installed, only using the installation sub-package of the core files to install the core files under the set installation path;
    providing an interface for receiving an input custom installation path while installing the to-be-installed software;
    withdrawing the installed core files under the set installation path if the custom installation path is different from the set installation path, and re-installing the core files under the custom installation path;
    running the core files right after the installation of the core files is completed, so that the active trigger function of the to-be-installed software operates normally wherein upon running the core files, running the core files by dynamically loading a dynamic link library (DLL) file in the core files; and
    when the core files begin to run after installation, using the installation sub-package of the non-core files to install the non-core files automatically.

8. The device according to claim 7, wherein upon installing the to-be-installed software, using the installation sub-package of the core files to install the core files with multiple threads so that the active trigger function of the to-be-installed software operates normally, wherein the multiple threads comprise a main thread for installation initialization operation of the core files and a logic thread for executing the installation procedure of the core files.

9. The device according to claim 8, wherein the multiple threads further comprise an interface thread for installation interface presentation of the core files.

10. The device according to claim 9, wherein when the installation sub-package of the core files is used to install the core files with multiple threads, the logic thread starts the main thread; during the startup of the main thread, a message is sent to notify the interface thread to set a timer and begin to present the installation interface; the interface thread controls display of an installation progress in the installation interface using the timer; and when the installation progress displays that the installation is completed, the interface thread sends a message to the logic thread in order to notify the logic thread of the completion of installation of the core files.

11. The device according to claim 7, wherein the set installation path comprises a default installation path and an alternate installation path; and wherein upon installing the to-be-installed software, using the installation sub-package of the core files to install the core files and run the core files under the default installation path; and if the installation of the core files fails under the default installation path, using the installation sub-package of the core files to install the core files and running the core files under the alternate installation path, so that the active trigger function of the to-be-installed software operates normally.

12. A non-transitory computer readable medium storing a computer program comprising instructions, wherein when the instructions are executed by a server, the server executes software installation operations comprising:

dividing all files of a to-be-installed software into core files for achieving an active trigger function and non-core files for achieving a passive trigger function;

generating an installation sub-package of the core files and an installation sub-package of the non-core files, and setting an installation path of the to-be-installed software;

when the to-be-installed software begins to be installed, only using the installation sub-package of the core files to install the core files directly under the set installation path;

providing an interface for receiving an input custom installation path while installing the to-be-installed software;

withdrawing the installed core files under the set installation path if the custom installation path is different from the set installation path, and re-installing the core files under the custom installation path;

running the core files right after the installation of the core files is completed, so that the active trigger function of the to-be-installed software operates normally wherein running the core files comprises running the core files by dynamically loading a dynamic link library DLL file in the core files; and when the core files begin to run after installation, using the installation sub-package of the non-core files to install the non-core files automatically.

* * * * *